T. S. Blair,
Pile for Railroad Rails,

Nº 38,548.    Patented May 19, 1863.

Witnesses:
A. B. Stoughton
Xaver Fendrick

Inventor:
Thos. S. Blair

UNITED STATES PATENT OFFICE.

THOMAS S. BLAIR, OF PITTSBURG, PENNSYLVANIA.

IMPROVEMENT IN RAILROAD-RAILS.

Specification forming part of Letters Patent No. 38,548, dated May 19, 1863.

*To all whom it may concern:*

Be it known that I, THOMAS S. BLAIR, of Pittsburg, in the county of Allegheny and State of Pennsylvania, have invented a new and useful improvement in rails for railroads, the same consisting in a rail having a carbonized head and an iron base; and I do hereby declare that the following is a full, clear, and exact description of the same, reference being had to the accompanying drawings, making a part of this specification, in which—

Figure 1:
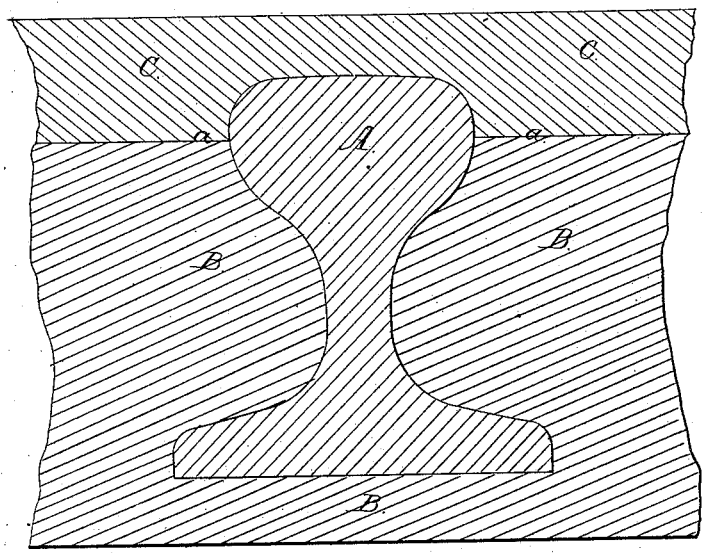
Figure 2:
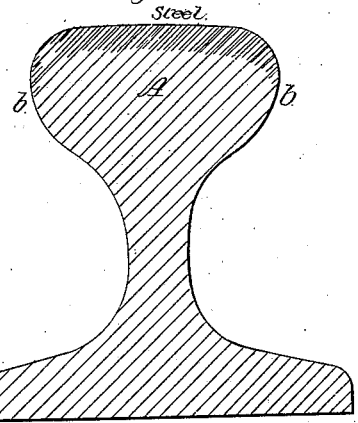

Figure 1 represents an end view of a rail as packed in clay and carbon for the purpose of carbonizing or converting into steel or semi-steel the head or tread portion of the rail, while the remaining portion is of iron. Fig. 2 represents a similar end view of a rail after it has been partially converted into steel, the more dense sectional lines representing the portion thus hardened or converted into steel, and the less dense sectional lines representing the portion that is of iron.

I am aware that railroad-rails of steel have been used; but their expense in the first place, and their liability to break, owing to the natural imperfect parts of all steel, and other causes, prevent the use of such rails on long lines of railroad. I am also aware that a plate or face of steel has been welded upon or to the head of railroad-rails. This, too, is expensive; but a greater objection exists—viz., it has been found in practice that such rails will split or peel off under the action of the rolling-stock of a railroad. I am also fully aware of the process of case-hardening or of putting a hard skin on metals of various forms. I lay no claim to any of these things.

The wearing away of rails upon railroads, under the heavy rolling-stock now universally used, is ascertained to be from ten to fifteen per cent. per annum on their original cost, and so great and burdensome has become this expense that various substitutes for the ordinarily-made rails have been essayed, some of which I have above mentioned; the others I do not mention, as they are still more remote from my plan. All, however, have such serious objections as to prevent their going into general use.

The kind above named, as having a steel face or head welded onto an iron base, possess two requisites of a durable rail—viz., the hardness of face or head, with the elasticity or tenacity of base; but as in use they are found to split or peel off, they are impracticable and unsafe, and therefore useless for their contemplated purpose.

The object and purpose of my invention is to produce a rail which shall have a hard head and an elastic or tenacious base, but made without welding two pieces together, so that they shall not split or peel off. This I have accomplished, and at a cost or expense so small as to justify their universal use on all railroads over which heavy burdens are carried.

The nature of my invention consists in the production of a finished rail for railroads, part steel and part iron, without welding the two metals together, and thus avoiding both the expense and the danger of a welded joint.

To enable others skilled in the art to make and use my invention, I will proceed to describe the same with reference to the drawings.

I take the rails A, of any shape or form, after they have been finished, and in the condition in which they are now laid down and used on railroads, and having first prepared a suitable carbonizing or steel-converting furnace, I place about half an inch in depth of clay, or any other carbon-resisting substance, in or on the bottom of the pot, B in Fig. 1 representing the clay or other substance. Upon this bed B, I place a series of rails side by side, until the bottom of the pot is full. I next fill in clay or other suitable carbon-resisting material between the rails, and up to about a line, *a*, which may be, say, half an inch below the top of the rail A. On this clay bed, and upon and over the exposed parts of the rails above it, I put carbon C, in any of its known conditions—common charcoal, by preference—and fill up to a height, say, half an inch above the top of the rail. Over this carbon is placed another layer of clay, another layer of rails, and another layer of charcoal or carbon, until the pot is filled, and then it is closed or sealed up, the several layers being placed in respect to each other as those above described. The converting-furnace is now heated up, and the process of carbonization begins with that part of the rails in contact with carbon, while the other portions in contact with the clay remain in their natural state of iron. The length of time required to convert the proper parts of the rails into steel will vary according to the amount of carbon used and the extent to which the carbonization is to penetrate or act upon the metal.

The converting-furnace should be so made as that the rails may be drawn out one at a time without chilling the others in the furnace, as they are to be acted upon after their withdrawal to smooth, straighten, and temper them. This withdrawal of the bars *seriatim*, without chilling or cooling of those in the pots, may be done by having a removable breast to the furnace or pot, of fire-bricks, or otherwise, and removing said breast in sections as the layers of rails are withdrawn. When the rails thus acted upon are taken out of the pot, the parts thereof that were in contact with the carbon, and a portion even below the carbon line, at the surface, as shown at *b*, Fig. 2, will be blistered, and be, in fact, what is known as "blister-steel." The rails are then passed through between rolls to roll down the blisters—one or two passes being sufficient—and then immersed in water to give "temper" to the steel. It is also necessary to straighten the rails, as the immersion of them in water to temper the steel portions may warp them. This straightening may be done in any of the well-known ways of straightening railroad-rails.

Having thus fully described the nature, purpose, and object of my invention, I would state that I am aware that it has been essayed to convert a portion of an iron rail into steel; but this would not produce a finished rail, as it would be rough, blistered, and crooked. This I do not claim; but

What I do claim is—

The production of a railroad-rail, part of steel and part of iron, without welding, by carbonizing a portion of the top of the rail, then rolling down the blisters, tempering and straightening the same, substantially in the manner and for the purpose described.

THOS. S. BLAIR.

Witnesses:
A. B. STOUGHTON,
XAVER FENDRICH.